(12) United States Patent
Tadayon

(10) Patent No.: US 8,444,773 B2
(45) Date of Patent: May 21, 2013

(54) GASPATH CLEANING SYSTEM

(75) Inventor: Shahin Tadayon, Miamisburg, OH (US)

(73) Assignee: Aero Jet Wash LLC, Miamisburg, OH (US)

( * ) Notice: Subject to any disclaimer, the term of this patent is extended or adjusted under 35 U.S.C. 154(b) by 0 days.

(21) Appl. No.: 13/544,246

(22) Filed: Jul. 9, 2012

(65) Prior Publication Data

US 2012/0273014 A1    Nov. 1, 2012

Related U.S. Application Data

(63) Continuation of application No. 12/502,788, filed on Jul. 14, 2009, now Pat. No. 8,246,753, which is a continuation-in-part of application No. 10/146,330, filed on May 13, 2002, now abandoned.

(60) Provisional application No. 61/089,740, filed on Aug. 18, 2008.

(51) Int. Cl.
*G08B 9/00*   (2006.01)

(52) U.S. Cl.
USPC ....... 134/166 R; 134/60; 134/123; 134/167 R

(58) Field of Classification Search
None
See application file for complete search history.

(56) References Cited

U.S. PATENT DOCUMENTS

| | | | | |
|---|---|---|---|---|
| 2,012,154 A | * | 8/1935 | Bates | 4/638 |
| 2,390,233 A | * | 12/1945 | Akerman et al. | 128/202.11 |
| 3,985,157 A | * | 10/1976 | Ferguson | 137/801 |
| 4,821,958 A | * | 4/1989 | Shaffer | 239/131 |
| 5,899,217 A | * | 5/1999 | Testman, Jr. | 134/104.4 |

* cited by examiner

*Primary Examiner* — Eric Golightly
(74) *Attorney, Agent, or Firm* — Thomas E. Lees, LLC

(57) ABSTRACT

A system for cleaning a jet engine with a first compressor stage and a second compressor stage comprises a water holding tank, a waterproof cover, and input hose coupled between the water holding tank and the waterproof cover. Further, the system includes a J-hook coupled to the input hose. The J-hook affixes to a front compressor stator of the second compressor stage of the jet engine. To clean the jet engine, fluid from the water holding tank is injected though the input hose and directed through the J-hook inside the engine.

11 Claims, 3 Drawing Sheets

GASPATH CLEANING SYSTEM

CROSS REFERENCE TO RELATED APPLICATIONS

This application is a continuation of U.S. patent application Ser. No. 12/502,788, entitled "GASPATH CLEANING SYSTEM", filed on Jul. 14, 2009, now allowed, which is a continuation-in-part of U.S. patent application Ser. No. 10/146,330, filed on May 13, 2002, and claims the benefit of U.S. Provisional Patent Application Ser. No. 61/089,740 filed on Aug. 18, 2008, the disclosures of which are hereby incorporated by reference.

FIELD OF THE INVENTION

Embodiments of the present disclosure relate generally to gaspath cleaning systems, collection systems for engine gaspath cleaning, and to suits operable with such cleaning systems and collection systems for collecting effluent from a gaspath cleaning operation. More particularly, the collection system and the suit generally are configured to facilitate the cleaning of a gaspath of a jet engine. The suit may at least partially cover turbojet and turbofan engines during gaspath cleaning operations, while the collection system may include, in addition to the suit, drainage hoses connecting the suit and a filtering system or drum so that the cleaning system defines a closed loop, thereby eliminating spillage of toxic effluent from the gaspath cleaning operation.

BACKGROUND

Several factors generally are involved in maintaining clean and efficient gas turbine engines. Such factors may include both preventive and non-preventative maintenance that may involve unscheduled removals and installations. Periodic gaspath cleaning is a preventive maintenance practice that is recommended to minimize compressor and turbine contamination.

There are documented cases of one-time compressor wash improvements in TSFC (Total Specific Fuel Consumption) and EGT (Exhaust Gas Temperature) of 0.85% and 8° C., respectively; however, experience indicates that gaspath cleaning prior to contamination is beneficial. For example, one operator has reported a fleet TSFC improvement of 1.0% when performing engine gaspath cleanings every three months. Generally, the recommended gaspath cleaning interval is every 1000 to 1200 hours commencing after a heavy maintenance. Engine manufacturers have estimated a reduction of 1.0% TSFC and 10° C. EGT over a 6000 hour period with regular gaspath cleaning. Using this procedure, there may be no significant improvements noted after each wash since the interval selected was one which would ease contaminant removal rather than one which would result in a noticeable increase in TSFC and EGT prior to wash.

An additional benefit of gaspath cleaning washes is the reduction of turbine sulphidation. Engine manufacturers' tests have shown that gaspath cleaning washes remove water soluble substances applied to the turbine. For example, a large domestic operator using gaspath cleaning washes at 100 to 150 hour intervals with expanded repair limits has been successful in reducing turbine blade scrap rate due to sulphidation damage at 6200 hours from 100% to less than 5%. It should be noted that gaspath cleaning for sulphidation reduction generally requires much shorter time intervals between washes than those used for compressor cleaning.

There are different approaches to performing gaspath cleaning. Some operators use a hose to spray a cleaning solution into the intake side of the engine, while other operators use a J hook that is inserted from the tail pipe, through the bypass core, and positioned right in front of the 3rd stage compressor so that the stream is sprayed rearward. In addition, other operators use an adapter that goes from the igniter plug hole inside of the engine and spray the solution therein.

For example, U.S. Pat. No. 5,899,217, issued May 4, 1999 to Testman, provides an engine wash recovery system which uses a partial covering (Apron type) over a turbo propeller engine and not a turbojet or turbofan engine to prevent spillage of the cleaning liquid run through the engine at slow speed with a collector for the liquid. It includes a small drain hose from a low point in the engine and a larger hose from the engine exhaust duct. It does not completely enclose the engine and would not work with current turbojet or turbofan engines.

U.S. Pat. No. 2,804,903, issued Sep. 3, 1957 to Davies, shows a protective transparent cover for a jet engine for shipping the engine to protect the engine, prevent spillage of oils and fuels, allow the engine to be viewed, and provide sealable openings for a lift device to access the engine. This device has no means of interconnecting to a cleaning and filtering system.

U.S. Pat. No. 3,646,980, issued Mar. 7, 1972 to Peterson, claims a lightweight jet engine cowl cover to protect a jet engine from dust and contaminants while the jet is on the ground with an opening to allow workmen to enter the engine and the use of a translucent sheet to admit light.

Again, no provision is made for use during a gaspath cleaning maintenance operation.

U.S. Pat. No. 5,143,321, issued Sep. 1, 1992 to Jackson, describes a folding protective cover for turbo-engines to cover the air inlet and exhaust ducts while the plane is on the ground with handles and the use of lightweight material to assist in the installation and removal of the cover, which folds up into a compact size for carrying and storing. Again, no provision is made for use during a gaspath cleaning maintenance operation. A universally applied and completely enclosed system for covering and enclosing a turbojet or turbofan engine and interconnecting to a filtration system is needed.

Based on the foregoing, none of these approaches account for the waste produced from the cleaning operations of jet engines as described herein. The chemical cleaning spray and toxic particulates removed from gas turbine engines are hazardous waste and should not be dumped into a normal drainage system.

As such, there is a need for an affordable collection system and suit operable with various jet engine gaspath cleaning operations and that collect effluent and preventing spillage of the effluent from the cleaning operations. Thereby, the collection system and suit offer an economical and ecological solution for the cleaning of jet engines on a regular basis and the collecting, and potential filtering, of the toxic effluent so as to minimize the negative impact on the environment generally associated with gaspath cleaning.

SUMMARY

According to aspects of the present invention, a system for cleaning a jet engine with a first compressor stage and a second compressor stage comprises a water holding tank, a waterproof cover, and input hose coupled between the water holding tank and the waterproof cover. Further, the system includes a J-hook coupled to the input hose. The J-hook affixes to a front compressor stator of the second compressor stage of the jet engine. To clean the jet engine, fluid from the water holding tank is injected though the input hose and directed through the J-hook inside the engine.

According to further aspects of the invention, the waterproof cover at least partially covers the jet engine and collects effluent resulting from the cleaning of the jet engine.

BRIEF DESCRIPTION OF THE DRAWINGS

The following detailed description of specific embodiments can be best understood when read in conjunction with the following drawings, where like structure is indicated with like reference numerals and in which.

Figure 1:
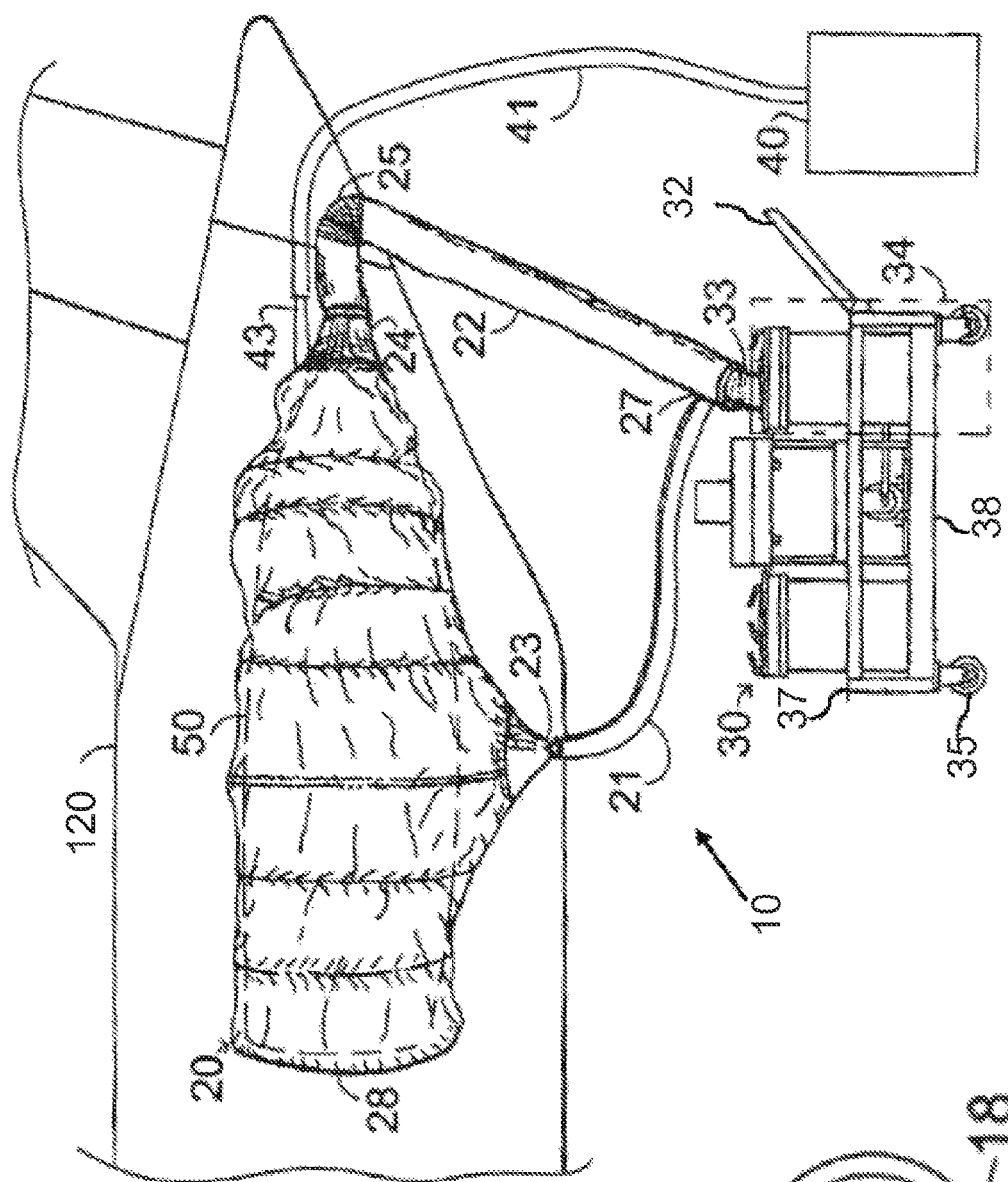
FIG. 1 is a side view of a collection system in accordance with one embodiment of the present disclosure in which a suit entirely encloses a jet engine with hoses connecting the suit to a pump, a filtering system, and a spray pump for spraying fluids into the engine.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION

Embodiments of gaspath cleaning systems and collection systems generally include a suit that may partially enclose or entirely enclose a turbojet and/or turbofan engine, as shown in FIGS. 1-4. The collection system facilitates cleaning operations of turbojet and turbofan engines so that they may more easily be performed on a frequent and/or regular basis and/or at any desired time, which promotes engine fuel efficiency, reduces engine maintenance, and prolongs engine life, thereby reducing engine fuel, engine repair, and engine replacement costs. In addition, it is contemplated that collection system may be compatible with numerous different turbojet and/or turbofan engines manufactured and used worldwide, thereby providing a global solution with an environmentally safe system for gas turbine engine maintenance.

The suit generally is connected with hoses or other draining, fluid conveying devices to a collection drum and/or to a filtration system to collect the effluent from cleaning operations and, thereby, eliminate spillage and dumping of toxic effluent and provide an economical and ecological solution for collection and eventual recycling or disposal of the effluent.

A system for cleaning a jet engine in an enclosed environment with fluids sealed in comprises a waterproof suit as described above, which is capable of enclosing a body of a jet engine to seal of all drainage from the jet engine. The system also comprises a collecting barrel or drum for the effluent and/or a filtering system comprising a pumping means and a filtering means. The filtering means is capable of receiving effluent fluids used in cleaning a jet engine from, for example, two drainage hoses from the cover. The filtering means is also capable of filtering the effluent fluids to remove toxic elements to make the fluid environmentally safe for disposal. The system still further comprises a cleaning fluid injection system having a water and cleaning material pump capable of pumping water and cleaning materials into the at least one water and cleaner input hose and into a jet engine for the purpose of cleaning the jet engine.

Referring initially to FIG. 1, an embodiment of a collection system 10 is illustrated. The collection system includes a substantially waterproof jet engine suit 20 for use in cleaning engines of an aircraft 120. The suit 20 comprises a substantially waterproof cover capable of at least partially enclosing a body of a jet engine 50 of the aircraft 120 to seal off effluent drainage from a cleaning operation implemented to clean the jet engine 50, as will be described in greater detail herein.

The cover has a form, structure and material strength capable of retaining its integrity as a seal around the body of the jet engine 50 while the jet engine 50 is turned over. Similarly, the cover has a form, structure and material strength capable of retaining its integrity as a seal around the body of the jet engine 50 while cleaning materials and water are sprayed into the jet engine 50. Moreover, the cover is capable of resisting damage from the water, the cleaning materials, and the matter removed from the jet engine 50 so that the cover can be reused in jet engine cleaning operations. The cover has a form and structure capable of fitting over a wide range of types of jet engines. The cover is fabricated of a rubberized fabric capable of resisting chemicals and impermeable to fluids. As shown in FIG. 1, the suit 20 entirely covers the jet engine 50.

Figure 2:
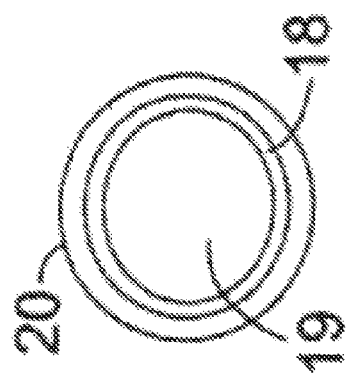
FIG. 2 is a front view of a collection system in accordance with another embodiment of the present disclosure in which a suit entirely encloses a jet engine.

Referring to FIG. 2, a front portion of the suit 20 may further comprise an opening 19 to admit air into the jet engine for turning over the engine in the gaspath cleaning process. The front opening 19 has an elasticized rim 18 around the opening to seal the remainder of the cover tightly around the body of the jet engine. The elasticized rim 18 preferably comprises a bungee cord loop sewn into the cover material around the perimeter of the rim.

Figure 3:
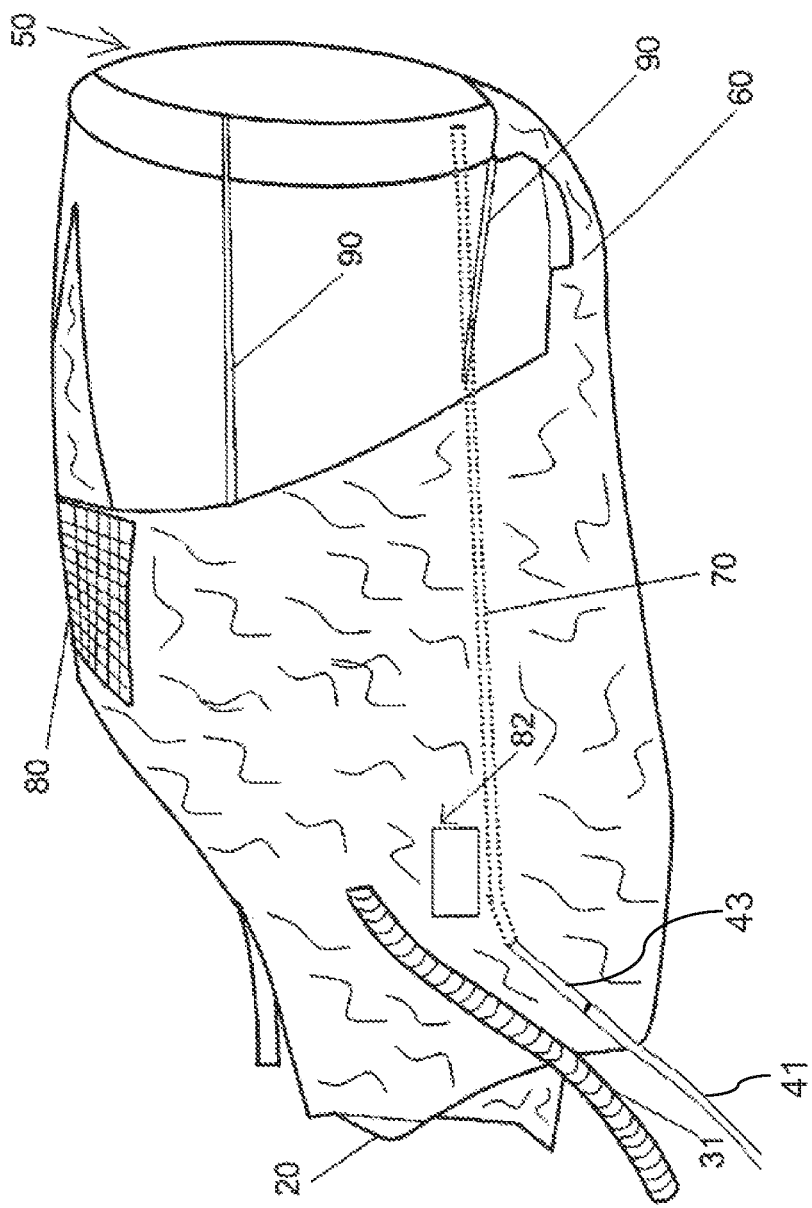
FIG. 3 is a side view of a collection system in accordance with another embodiment of the present disclosure in which a suit partially encloses a jet engine.
Figure 4:
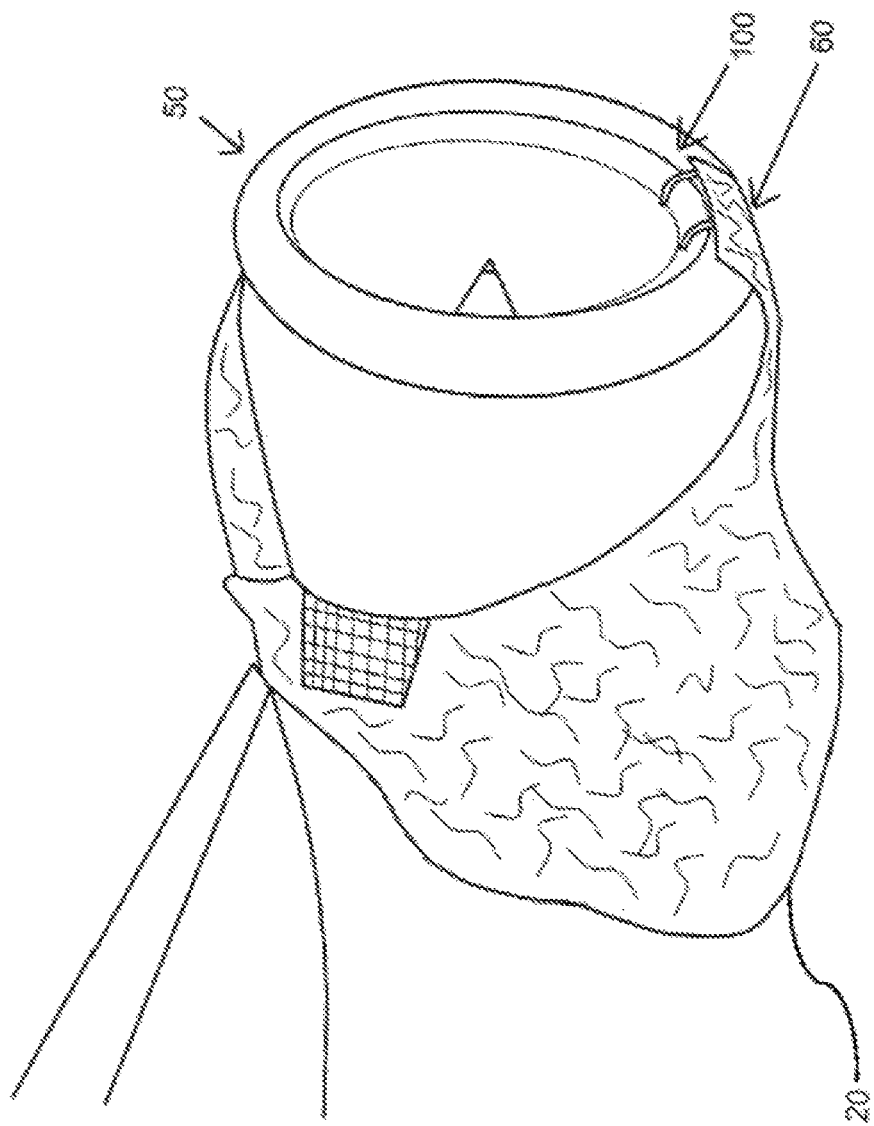
FIG. 4 is a side view of a collection system in accordance with another embodiment of the present disclosure in which a suit partially encloses a jet engine.

According to another embodiment, shown in FIGS. 3 and 4, the suit 20 is configured to partially cover a jet engine 50 and is shortened in length, thereby reducing the weight and the amount of material of the suit 20. Referring specifically to FIG. 3, the suit 20 may be secured around the jet engine 50 by one or more straps 90. One or more meshed screens 80 are installed in the back and/or on top of the suit 20 to prevent pressure build up in the collection system and/or the suit 20 and at the same time preventing effluent (wastewater) from escaping the collection system and/or the suit 20 and releasing into the surrounding environment. The meshed screens 80 trap the effluent in the suit 20, while simultaneously permitting air to pass therethrough and exit the suit 20. An apron 60 of the suit 20 may help collect the effluent coming out of the drain mast under the jet engine 50 in the front section of the suit 20.

According to the embodiment shown in FIG. 4, one or more hooks 100 under the jet engine 50 may be attached to the apron 60 by a metal bar (not shown) going across the width of the apron 60. The hooks 100 hold the suit 20 while they attach to the lip of the inlet cowling of the jet engine 50. The hooks 100 may be used in addition to or in the alternative of the straps 90 (shown in FIG. 3) going from one side of the suit 20 to the other side of the suit 20 by going over the top of the jet engine 50.

Referring back to FIG. 3, the suit 20 also may comprise a window 82. The window 82 may be a see-through plastic window 82 installed on one or more sides of the suit 20. The window 82 allows an operator of the collection system to monitor the amount of effluent discharged from the tail pipe and the drain ports of the jet engine 50.

Referring now back to FIG. 1, a sealed waterproof connection 43 to the suit 20 may receive water and cleaning fluids from a water and cleaner input hose 41 for inputting water and cleaners used in cleaning jet engines from a water and cleaning agent injection system 40, which is also portable and easily transported between engines and between planes. The injection system 40 may comprise a water holding tank, an injection water hose, and a water hose port. Water and, if desired, cleaning fluids in the water holding tank are injected, generally by a pump that may be incorporated into the injection system. The water and cleaning fluids are injected into the suit 20 through the input hose 41 and the waterproof connection 43.

Referring again back to FIG. 3, generally, two water waterproof connections 43 are provided, one on each side of the suit 20 to allow the input hose 41 to get to the inside of the suit 20 so that the input hose 41 may be connected to a J hook 70, which goes through an engine bypass from the back of the jet engine 50 by an engine duct fairing. The J hooks 70 are hooked up to the front of the compressor stators of the second compressor stage. Notably, these compressor stators are stationary. The curved section of the J hook 70 hangs against an engine barrel (core) for efficient delivery of cold water, hot water, cleaning fluids, or a combination thereof into the jet engine 50 and prevents fluids from going through the engine bypass.

Referring back to FIG. 1, the collection system 10 may also comprise a drainage system to collect and drain the effluent from the suit 20 as a result of cleaning the jet engine 50. In one embodiment, the cover has a sealed substantially waterproof connection to at least one drainage hose. The sealed waterproof connections 23, 24 comprise funnel-shaped rubber boots adapted for connection to hoses 21 and 22, respectively. In one embodiment, the collection system 10 comprises two drainage hoses that include one bottom drainage hose 21 with a bottom sealed connection 23 to catch bottom effluent fluids in the suit 20, and an exhaust drainage hose 22 with an exhaust sealed connection 24 and a sealed elbow bend 25 to catch and drain away remaining effluent fluids in the suit 20 to a filtering system 30 via connections 27, 33 respectively.

The drainage system may be vacuum-driven. For example, in one embodiment, shown in FIG. 3, the drainage system that may comprise a vacuum hose 31, a vacuum device, and a container 34 (FIG. 1). More particularly, the drainage system may allow the effluent to be collected by the flexible vacuum hose 31 as the effluent exits the suit 20. The vacuum hose 31 may be connected to the vacuum that draws the effluent from the hose into the container, such as a 55-gallon drum, or other container. A filter system, as described in greater detail below, may be inside of the container such that as the effluent is drawn into the container, the effluent passes through a series of filters for filtration treatment to at least partially cleanse the water of chemicals. The filtered water is then directed, generally by a pump, which may be incorporated into the vacuum system, back into the water holding tank of an injection system. The water holding tank, and other components of the collection system, may are located inside of a mobile unit for repeat delivery and reuse. The ability to reuse the water may eliminate the need to collect and dispose of the effluent.

Referring back to FIG. 1, the collected and drained effluent fluids may be conveyed by the hoses to a storage device, such as a drum, and/or to a filtering system 30. One example of a suitable filtering system includes a portable filtering and processing system 30 (FS-55 manufactured by Fabco Industries) that may be used in cleaning the jet engine 50 and the matter removed from the jet engine 50 during cleaning, including toxic chemicals and particulates and deposits containing cyanide, lead, and copper, as well as other chemicals from the cleaning fluid. This portable filtering system 30 may comprise a pump and filters on a cart with a base 38, side rails 37, wheels 35, and handle 32.

Referring to FIGS. 1-4 generally, additional embodiments of the present disclosure relate generally to methods for cleaning jet engines using an embodiment of a collection system described herein, or inferable therefrom. One such embodiment relates to a method comprising covering a jet engine 50 with a waterproof suit 20 comprising a cover capable of enclosing a body of a jet engine 50 to seal of all drainage from the jet engine 50. As mentioned above, the cover includes sealed waterproof connections 23 and 24 and preferably two drainage hoses 21 and 22 for draining fluids used in cleaning the jet engine 50 into a filtering system and for draining the matter removed from the jet engine 50 in cleaning. The cover further includes a sealed waterproof connection 43 to at least one water and cleaner input hose 41 for inputting water and cleaners used in cleaning jet engines. Moreover, the cover has a form, structure, and material strength capable of retaining its integrity as a seal around the body of the jet engine 50 while the jet engine 50 is turned over and cleaning materials and water are sprayed into the engine. Still further, the cover is capable of resisting damage from the water, the cleaning materials, and the matter removed from the jet engine so that the cover can be reused in jet engine cleaning operations. Also, the cover has a form and structure capable of fitting over a wide range of types of jet engines. The method further includes using a cleaning fluid pumping system 40 comprising a water and cleaning material pump to pump water and cleaning materials into at least one water and cleaner input hose 41 and into a jet engine for the purpose of cleaning the jet engine. Further, the method includes collecting and filtering effluent fluids used in cleaning a jet engine by using a filtering system 30 comprising a pumping means and a filtering means capable of receiving effluent fluids used in cleaning a jet engine from the drainage hoses 21 and 22 and capable of filtering the effluent fluids to remove toxic elements and make the fluid environmentally safe for disposal. Moreover, the method includes pumping the effluent fluids into at least one container for disposal using a means for pumping filtered effluent fluids 30.

Some embodiments of the method further include turning over the jet engine 50 during the cleaning operation and admitting air into the jet engine 50 by means of a front portion of the cover, which includes an opening 19 to admit air into the jet engine 50 for turning over the engine in the cleaning process. The front opening includes an elasticized rim 18 around the opening to tightly seal the remainder of the cover around the body of the jet engine 50.

While certain representative details have been shown for purposes of illustrating an embodiment of the invention, it will be apparent to those persons skilled in the art that various changes in the methods and apparatus disclosed herein may be made without departing from the scope of the invention. Further, the embodiments described and illustrated herein are provided for exemplary purposes only and various other embodiments may be derived or inferred therefrom.

Further, it is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural factors of the component.

It is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms substantially," "significantly," and "approximately" are utilized herein to represent the inherent degree of uncertainty that may be attributed to any quantitative comparison, value, measurement, or other representation. The terms "substantially," "significantly," and "approximately" are also utilized herein to represent the degree by which a quantitative representation may vary from a stated reference without resulting in a change in the basic function of the subject matter at issue.

Having described embodiments of the present disclosure in detail, and by reference to specific embodiments thereof, it will be apparent that modifications and variations are possible without departing from the scope of the embodiments defined in the appended claims. More specifically, although some aspects of embodiments of the present disclosure are identified herein as preferred or particularly advantageous, it is contemplated that the embodiments of the present disclosure are not necessarily limited to these preferred aspects.

What is claimed is:

1. A system for cleaning a jet engine with a first compressor stage and a second compressor stage, the system comprising:
   a water holding tank;
   a waterproof cover including a waterproof connection at a rear of the waterproof cover;
   an input hose directly coupled between the water holding tank and the waterproof connector of the waterproof cover; and
   a J-hook coupled to the input hose via the waterproof connection, wherein the J-hook affixes to a front compressor stator of the second compressor stage of the jet engine;
   wherein:
      fluid from the water holding tank is injected through the input hose and directed through the J-hook inside the engine.

2. The system of claim 1, wherein the waterproof cover at least partially covers the jet engine.

3. The system of claim 2, wherein the waterproof cover further comprises an elasticized rim to seal the waterproof cover around an opening on the jet engine.

4. The system of claim 2 further comprising a heating source thermally coupled to the water holding tank, wherein the heating source heats the fluid.

5. The system of claim 1, wherein the J-hook affixes to the front compressor stator of the second compressor stage of the jet engine through a back of the engine towards a front of the engine.

6. The system of claim 1, wherein the waterproof cover collects resultant effluent.

7. The system of claim 6 further comprising:
   a pump;
   a storage container coupled to the waterproof cover; and
   a drainage hose coupled between the waterproof cover and the storage container, wherein the pump pumps the effluent from the waterproof cover to the storage container.

8. The system of claim 7 further comprising a filter coupled to the storage container, wherein the filter removes foreign particles from the effluent.

9. The system of claim 1 wherein the waterproof cover further comprises a screen to prevent pressure build-up during the cleaning of the jet engine, yet effluent from cleaning the engine is still collected in the waterproof cover.

10. The system of claim 1, wherein the fluid comprises water.

11. The system of claim 1, wherein the fluid comprises water and detergent.

* * * * *